United States Patent [19]
Sugita et al.

[11] Patent Number: 6,125,305
[45] Date of Patent: *Sep. 26, 2000

[54] IMAGE FORMING SYSTEM IN WHICH IMAGE PROCESSING APPARATUS IS CONNECTED TO IMAGE FORMING APPARATUS

[75] Inventors: Shigeru Sugita, Sayama; Masaki Nakano, Ebina; Mitsuru Amimoto, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/848,185

[22] Filed: Apr. 29, 1997

Related U.S. Application Data

[63] Continuation of application No. 08/359,814, Dec. 20, 1994, abandoned.

[30] Foreign Application Priority Data

Dec. 28, 1993 [JP] Japan .................................. 5-337466

[51] Int. Cl.$^7$ .................................................. G06F 17/00
[52] U.S. Cl. ......................... 700/213; 700/2; 340/825.06
[58] Field of Search ..................... 355/478, 319, 355/323; 271/298; 340/131, 138, 825.06, 825.16; 700/11, 12, 2, 9, 213, 219

[56] References Cited

U.S. PATENT DOCUMENTS

| | | | |
|---|---|---|---|
| 3,905,594 | 9/1975 | Davis | 271/173 |
| 4,190,350 | 2/1980 | Donohue et al. | 355/14 R |
| 4,437,660 | 3/1984 | Tompkins et al. | 271/290 |
| 4,501,419 | 2/1985 | Takahasi et al. | 271/288 |
| 4,524,394 | 6/1985 | Nagashima | 358/296 |
| 5,048,819 | 9/1991 | Kosaka et al. | 271/288 |
| 5,061,958 | 10/1991 | Bunker et al. | 355/209 |
| 5,075,786 | 12/1991 | Ikenoue et al. | 358/449 |
| 5,136,343 | 8/1992 | Braswell | 355/319 |
| 5,155,538 | 10/1992 | Monfalcone | 355/313.3 |
| 5,159,324 | 10/1992 | Ohtani et al. | 340/712 |
| 5,206,695 | 4/1993 | Iwata | 355/323 |
| 5,270,563 | 12/1993 | Mahoney | 177/145 |
| 5,328,169 | 7/1994 | Mandel | 270/290 |
| 5,342,034 | 8/1994 | Mandel et al. | 270/53 |
| 5,358,238 | 10/1994 | Mandel et al. | 271/298 |
| 5,390,910 | 2/1995 | Mandel et al. | 271/296 |
| 5,435,544 | 7/1995 | Mandel | 271/298 |

FOREIGN PATENT DOCUMENTS 3510879 10/1985 Germany .
61-033436 2/1986 Japan .

OTHER PUBLICATIONS

European Search Report (Aug. 25, 1996).
Australian Search Report (Aug. 19, 1999).

*Primary Examiner*—Paul P. Gordon
*Attorney, Agent, or Firm*—Fitzpatrick, Cella, Harper & Scinto

[57] ABSTRACT

An image forming system, of the present invention, which has an image forming apparatus for forming an image on a paper sheet in accordance with image data output from a computer includes a plurality of storage units, provided to the image forming apparatus, for storing the paper sheet, a plurality of detecting units for detecting the paper sheet on each of the plurality of storage units, a display unit, provided to the computer for displaying a detection result from each of the plurality of detecting units, an input unit, provided to the computer, for inputting an instruction for selecting the storage unit, and a control unit, provided to the image forming apparatus, for selecting the storage unit in accordance with the instruction input from the input unit. With this arrangement, the operator of the computer can detect the sheet storage status of the storage unit while staying in front of the computer, thereby selecting a desired storage unit.

43 Claims, 6 Drawing Sheets

IMAGE FORMING SYSTEM IN WHICH IMAGE PROCESSING APPARATUS IS CONNECTED TO IMAGE FORMING APPARATUS

This application is a continuation of application Ser. No. 08/359,814, filed Dec. 20, 1994, now abandoned.

BACKGROUND OF THE INVENTION

1. Field of the Invention

The present invention relates to an image forming system in which an image processing apparatus is connected to an image forming apparatus.

2. Related Background Art

Conventionally, an image formed by a personal computer or the like is printed out by a printer. However, such a printer has only one ejecting paper tray and cannot sort printed recording paper sheets. A printer has been proposed which is connected to a sorter so as to sort printed recording paper sheets. However, such a printer only controls the storage destination in the sorter from the printer side. An operator operating in front of a personal computer has no means for detecting a specific storage unit in the sorter, resulting in difficulty in finding recorded paper sheets destinated for the operator.

SUMMARY OF THE INVENTION

It is an object of the present invention to provide an image forming system for solving the above problem.

It is another object of the present invention to provide an image forming system in which an operator can detect the status of each storage unit of an image forming apparatus from an image processing apparatus side, thereby selecting the storage unit.

It is still another object of the present invention to provide an image forming system in which an operator at an image processing apparatus can certify an automatically selected storage unit of an image forming apparatus.

It is still another object of the present invention to provide an image forming system in which the operator at an image processing apparatus can change an automatically selected storage unit of an image forming apparatus.

Other objects and features of the invention will be apparent from the following detailed description in conjunction with the accompanying drawings.

DETAILED DESCRIPTION OF THE PREFERRED EMBODIMENTS

First Embodiment

Figure 1:
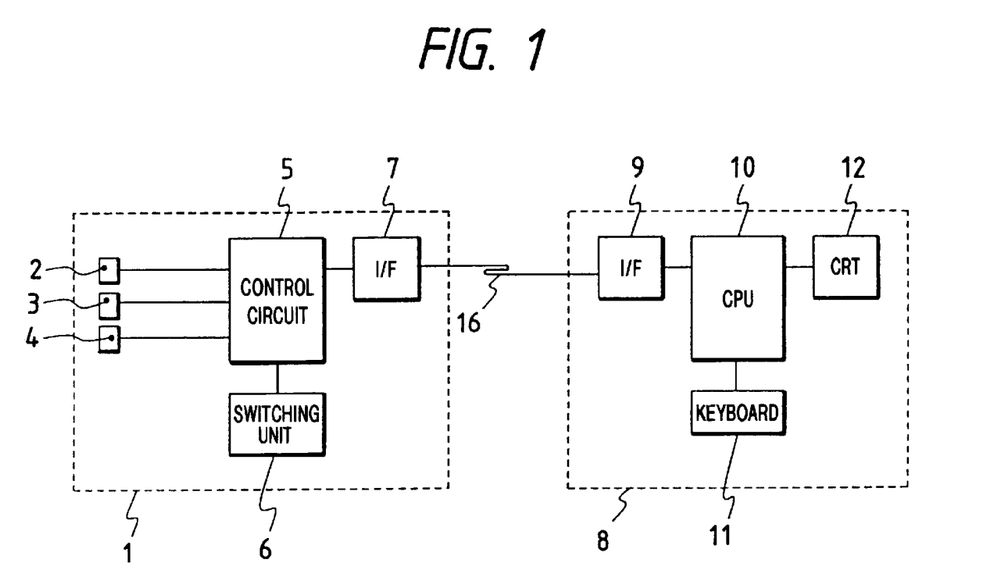
FIG. 1 is a block diagram showing an image forming system of an embodiment of the present invention.
Figure 2:
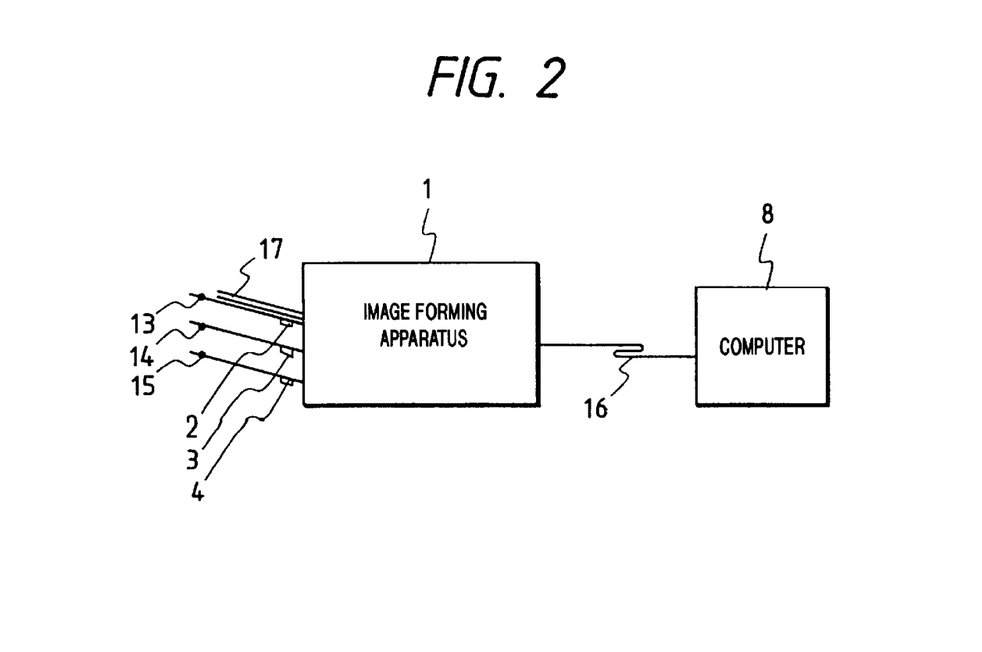
FIG. 2 is a view showing the outer appearance of the image forming system.
Figure 3:
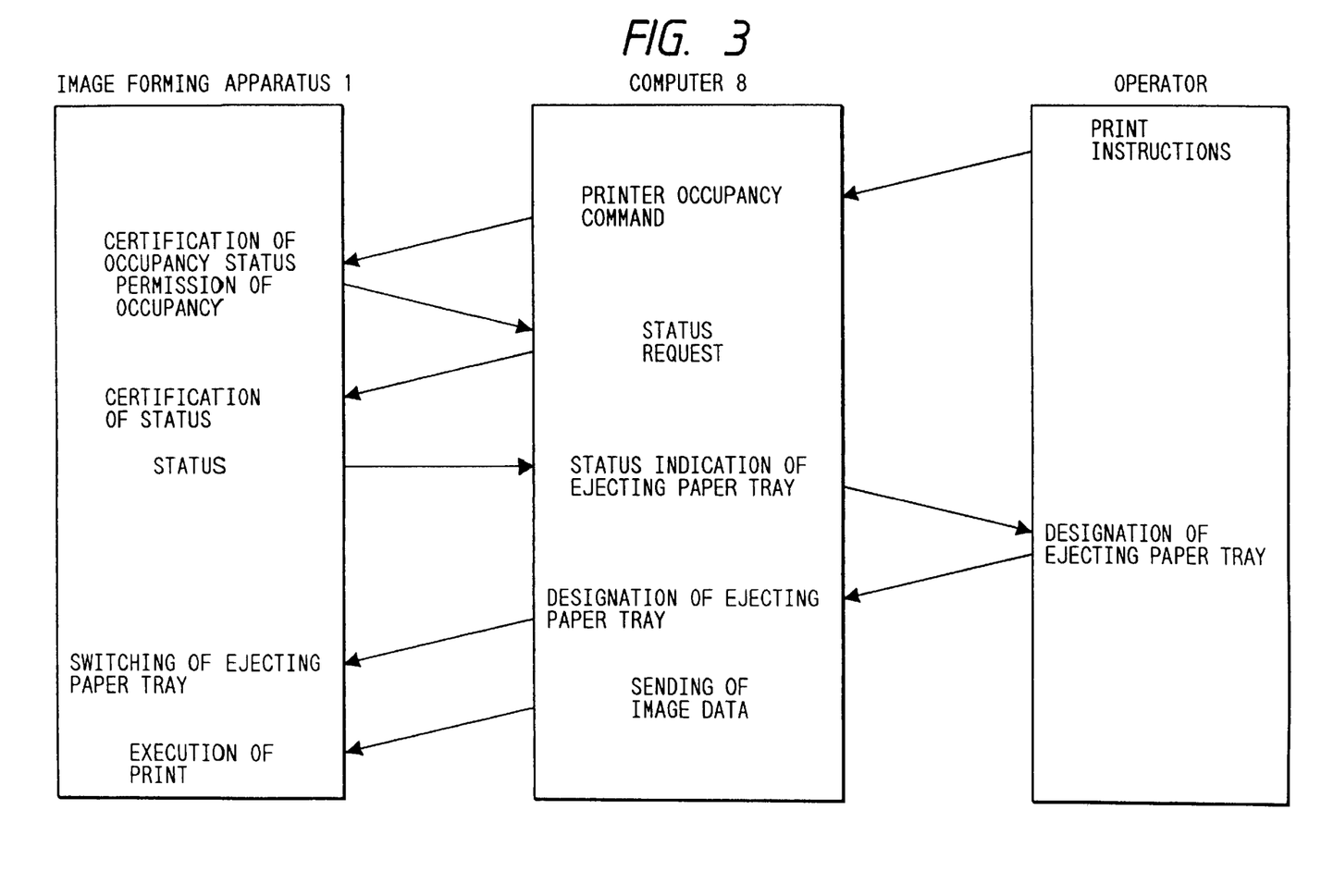
FIG. 3 is a view for explaining a communication operation of the image forming system.

FIGS. 1 to 3 are views showing the first embodiment of the present invention. Referring to FIGS. 1 and 2, an image forming apparatus 1 records image data from a computer 8. A sensor 2 detects the presence/absence of recording paper sheets on an ejecting paper tray 13. A sensor 3 detects the presence/absence of recording paper sheets on an ejecting paper tray 14. A sensor 4 detects the presence/absence of recording paper sheets on an ejecting paper tray 15. A control circuit 5 controls all operations in the image forming apparatus, including processing of signals from the sensors 3 to 4. An ejecting paper tray switching unit 6 switches the ejecting paper tray for receiving recording paper sheets in accordance with a signal from the control circuit. An interface (I/F) 7 on the image forming apparatus side connects the image forming apparatus 1 to the computer 8 through communication. The computer 8 generates or stores image data. An interface (I/F) 9 on the computer 8 side connects the image forming apparatus 1 to the computer 8 through communication. A CPU 10 controls the computer 8. A keyboard 11 is used by an operator to input an instruction to the computer 8. A CRT 12 serves as the display unit of the computer 8. The ejecting paper tray 13 serves as one of the storage units for storing recording paper sheets. The ejecting paper tray 14 serves as one of the storage units for storing recording paper sheets. The ejecting paper tray 15 serves as one of the storage units for storing recording paper sheets. A cable 16 connects the image forming apparatus 1 to the computer 8 for communication. Recording paper sheets 17 are selectively ejected onto the ejecting paper trays. The operation of the first embodiment is sequentially described in FIG. 3.

The operation in the above arrangement will be described below with reference to FIG. 3.

When an image generated or stored in the computer 8 is to be printed out, the operator inputs a print instruction from the keyboard 11 to the computer 8. Upon reception of this instruction, the CPU 10 of the computer 8 transmits a printer occupancy command to the image forming apparatus 1 through the I/F 9. Upon reception of the printer occupancy command through the I/F 7, the control circuit 5 of the image forming apparatus 1 certifies the occupancy status of the image forming apparatus itself. If a recording enable state is set, a command for permission of occupancy is transmitted to the computer 8 (at this time, if the image forming apparatus is connected to a plurality of computers, and recording of an image from one of the remaining computers is being performed, or if the image forming apparatus singly has a copy function, and a copying operation is being performed, a command for rejection of occupancy is sent. However, this status is not the subject matter, and a detailed description thereof will be omitted).

Upon reception of the command for permission of occupancy, the computer 8 sends a status request to grasp the status of the image forming apparatus 1. Upon reception of the status request, the image forming apparatus 1 sends a status containing information of the presence/absence of recording paper sheets on each ejecting paper tray. Upon reception of this status, the computer 8 indicates the status of each ejecting paper tray on the CRT 12, thereby prompting the operator to select an ejecting paper tray. In FIG. 2, the recording paper sheets are present on the ejecting paper tray 13. Therefore, the status indication of the ejecting paper tray 13 is the "presence of recording paper sheets", and the status indication of the ejecting paper trays 14 and 15 is the "absence of recording paper sheets". Upon checking the indication, the operator selects the ejecting paper tray 14 or 15 when the recording paper sheets are to be stored on an available ejecting paper tray, and inputs a designation of the ejecting paper tray from the keyboard 11 to the computer 8.

In this case, assume that the ejecting paper tray 14 is selected. Upon reception of the designation of the ejecting paper tray, the computer 8 transmits a command for designation of the ejecting paper tray to the image forming apparatus 1 such that the recording paper sheets are output onto the ejecting paper tray 14. Upon reception of the command for designation of the ejecting paper tray, the control circuit 5 sends a signal to the ejecting paper tray switching unit 6. The ejecting paper tray switching unit 6 switches a convey path (not shown) to the ejecting paper tray such that the recording paper sheets are ejected onto the ejecting paper tray 14. The computer 8 transmits the image data to the image forming apparatus 1 during this time, though no problem is posed because a time required for switching of the convey path is sufficiently shorter than that required from reception of the image data to the end of print. Upon reception of the image data, the image forming apparatus executes print and stores the recording paper sheets on the designated ejecting paper tray 14.

Second Embodiment

Figure 4:
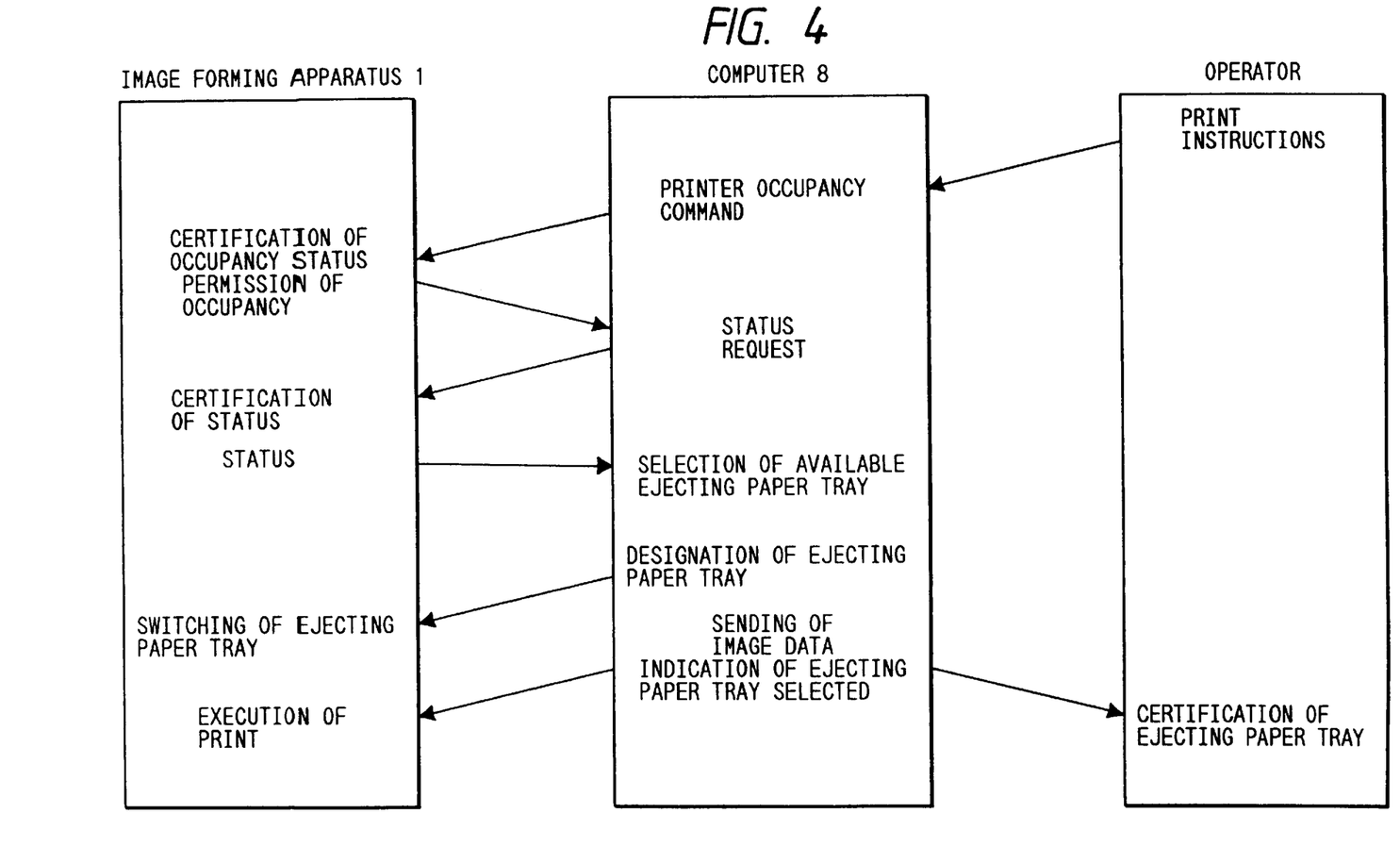
FIG. 4 is a view for explaining a communication operation of the image forming system.

FIGS. 1, 2, and 4 are views showing the second embodiment. A description of FIGS. 1 and 2 is the same as that in the first embodiment and will be omitted.

A description will be made with reference to FIG. 4. An operation before reception of a status signal by a computer 8 is the same as that in the first embodiment, and a detailed description thereof will be omitted. An operation after reception of the status by the computer 8 will be described. Upon reception of the status, the computer 8 automatically selects an available ejecting paper tray and transmits a command for designation of the ejecting paper tray to an image forming apparatus 1. Upon reception of the command for designation of the ejecting paper tray, a control circuit 5 in the image forming apparatus 1 sends a selection signal to an ejecting paper tray switching unit 6. The ejecting paper tray switching unit 6 switches a convey path to the ejecting paper tray such that recording paper sheets are ejected onto an ejecting paper tray 14. The computer 8 transmits image data to the image forming apparatus 1 during this time, and at the same time, indicates the ejecting paper tray number selected by the computer 8 on a CRT 12, thereby informing an operator of the ejecting paper tray for receiving the recording paper sheets. Upon reception of the image data, the image forming apparatus 1 executes print and ejects the recording paper sheets onto the ejecting paper tray 14.

Third Embodiment

Figure 5:
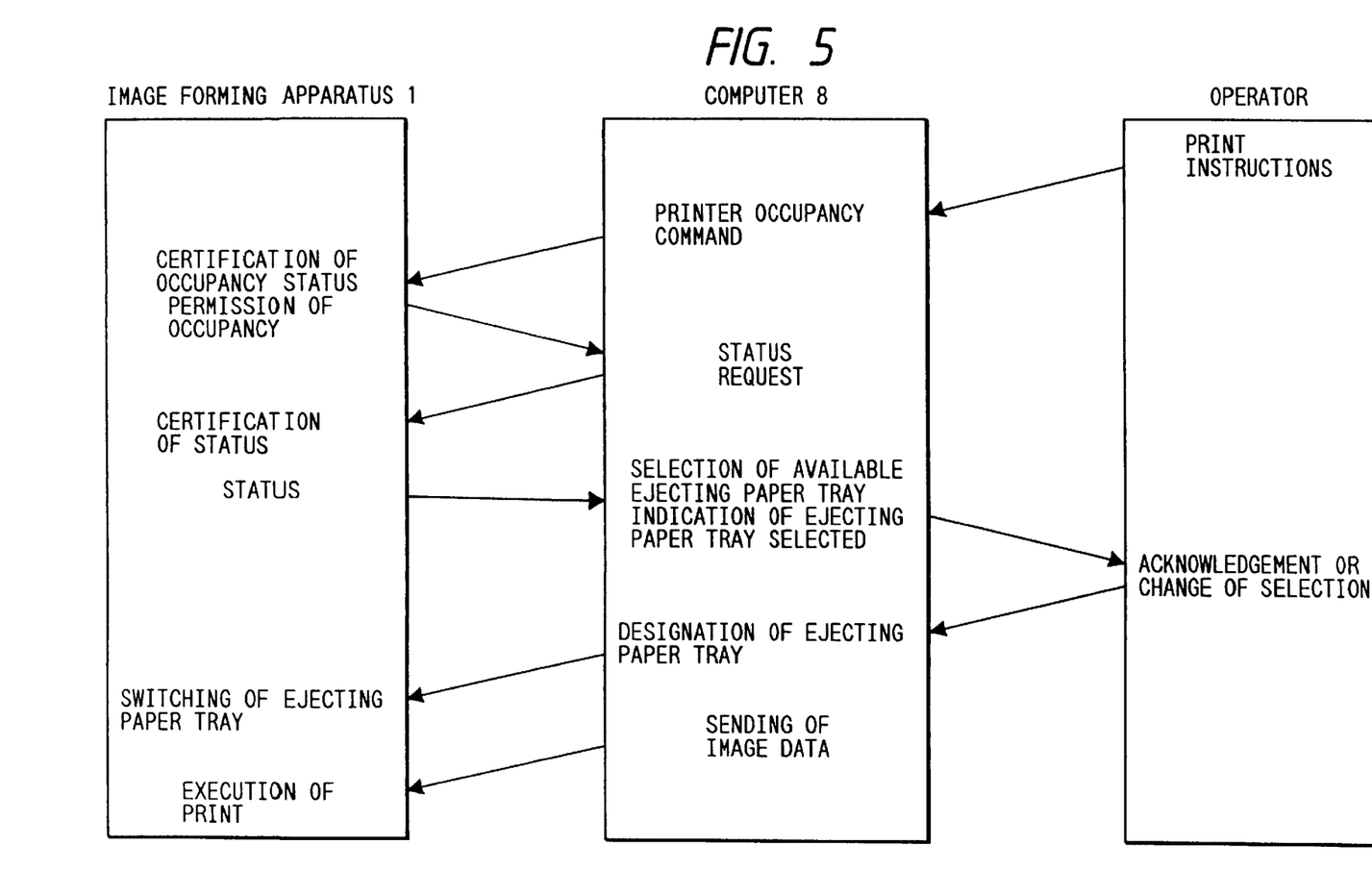
FIG. 5 is a view for explaining a communication operation of the image forming system.

FIGS. 1, 2, and 5 are views showing the third embodiment. A description of FIGS. 1 and 2 is the same as that in the first embodiment and will be omitted. In FIG. 5, an operation from reception of a status signal by a computer 8 to automatic selection of an available tray is the same as that in the second embodiment, and a detailed description thereof will be omitted. The subsequent operation will be described with reference to FIG. 5.

Upon selection of the ejecting paper tray, the computer 8 indicates the selection result and the status of each ejecting paper tray on a CRT 12, thereby requesting an operator for certification. Upon checking the indication, the operator inputs data representing acknowledgement or change of selection of the ejecting paper tray selected by the computer 8 from a keyboard 11. The computer 8 transmits a command for designation of the ejecting paper tray to an image forming apparatus 1 in accordance with the data input from the keyboard 11. Thereafter, the same operation as that in the first embodiment is performed to store recording paper sheets on an ejecting paper tray 14.

Fourth Embodiment

Figure 6:
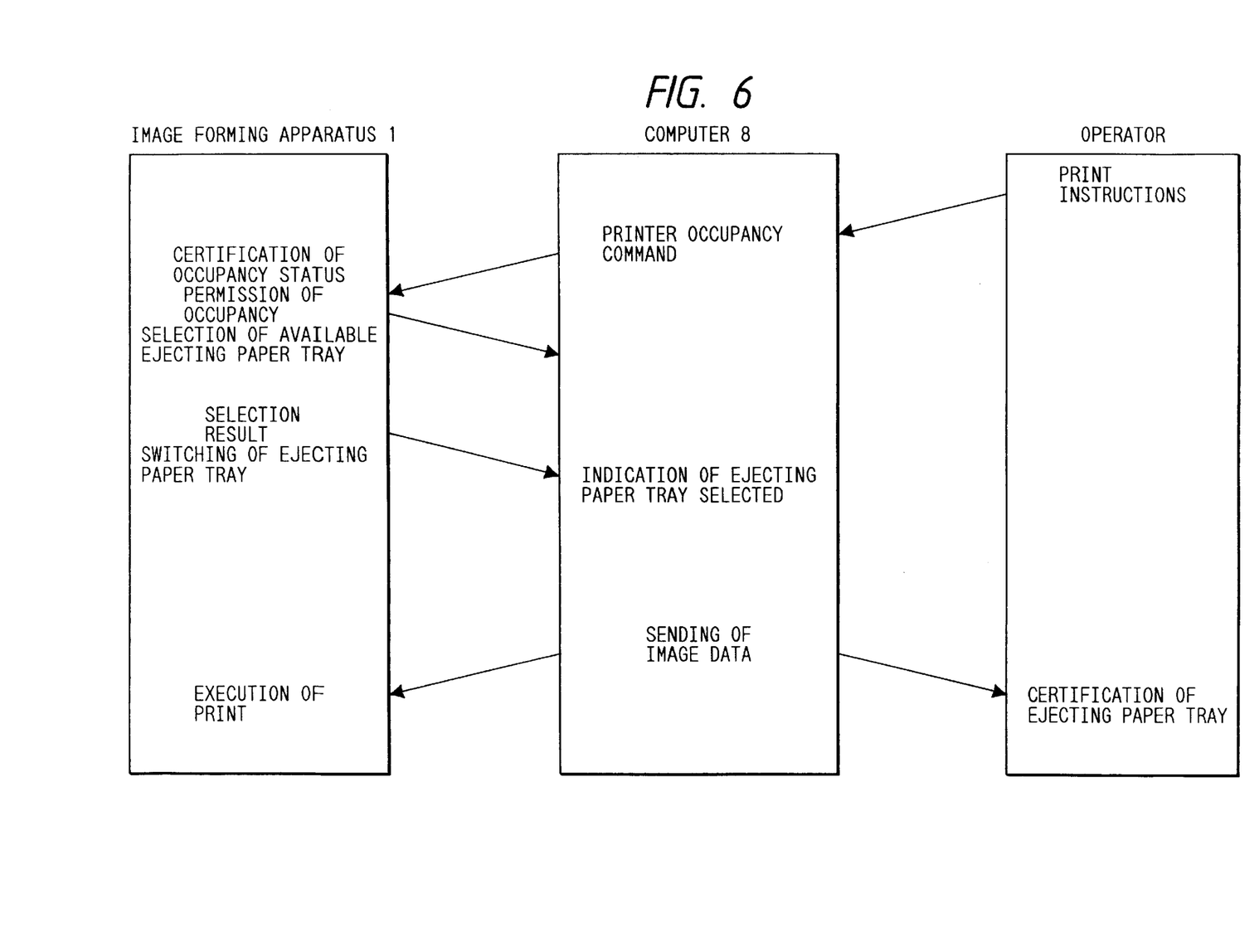
FIG. 6 is a view for explaining a communication operation of the image forming system.

FIGS. 1, 2, and 6 are views showing the fourth embodiment. A description of FIGS. 1 and 2 is the same as that in the first embodiment and will be omitted. An operation before transmission of a command for permission of occupancy by an image forming apparatus 1 is the same as that in the first embodiment. The subsequent operation will be described with reference to FIG. 6.

Upon transmission of the command for permission of occupancy, a control circuit 5 automatically selects an available ejecting paper tray and sends a selection signal to an ejecting paper tray switching unit 6. The ejecting paper tray switching unit 6 switches a convey path such that recording paper sheets are ejected onto the selected ejecting paper tray and transmits data representing the selection result to a computer 8. Upon reception of the data representing the selection result, the computer 8 indicates the selection result on a CRT 12 in accordance with the data to inform an operator of it, and sends image data to the image forming apparatus 1.

Thereafter, the same operation as that in the first embodiment is performed to store the recording paper sheets on an ejecting paper tray 14.

Fifth Embodiment

Figure 7:
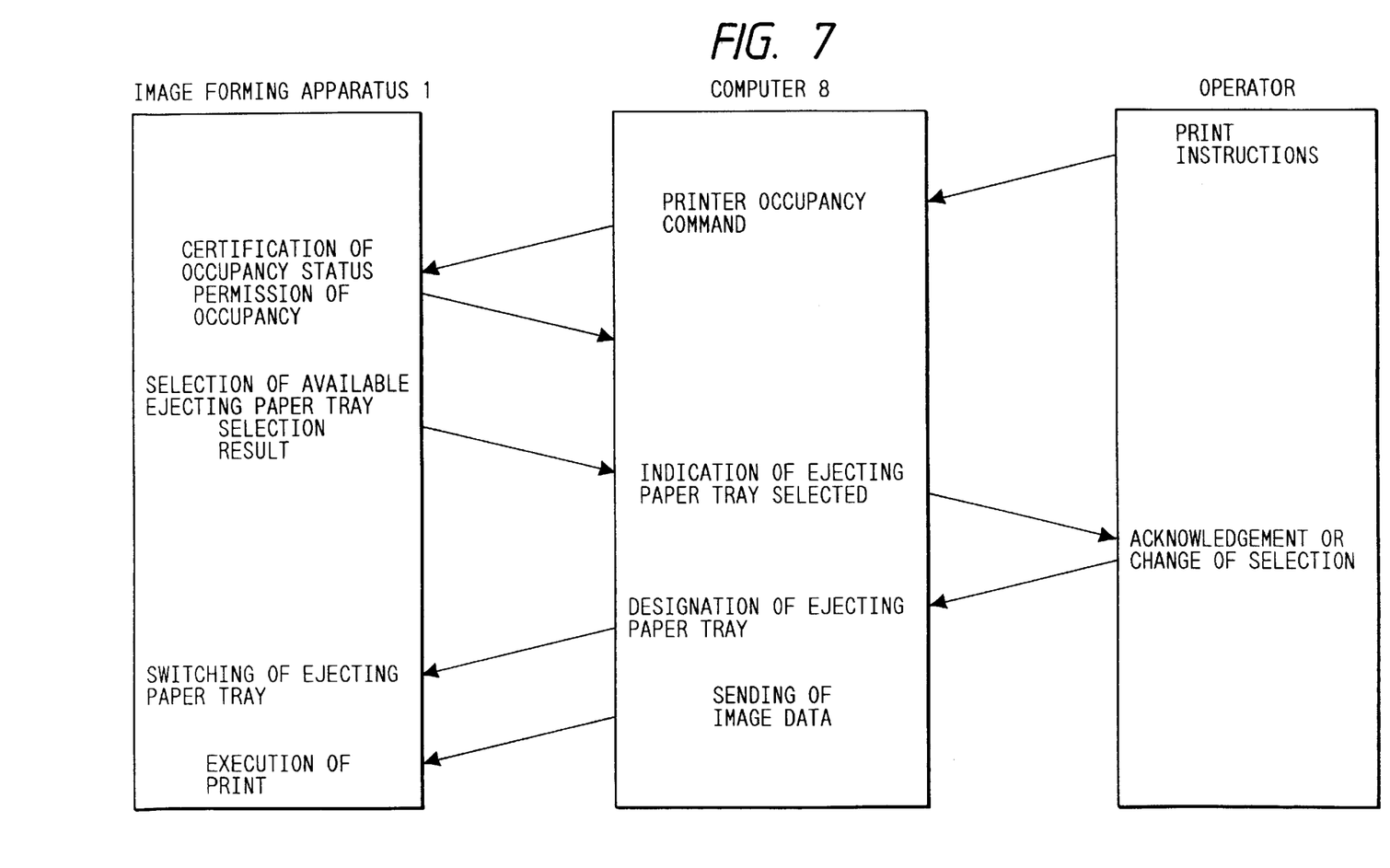
FIG. 7 is a view for explaining a communication operation of the image forming system.

FIGS. 1, 2, and 7 are views showing the fifth embodiment. A description of FIGS. 1 and 2 is the same as that in the first embodiment and will be omitted. An operation before reception of data representing the selection result of an ejecting paper tray is the same as that in the fourth embodiment, and a detailed description thereof will be omitted. The subsequent operation will be described with reference to FIG. 7.

Upon reception of the data representing the selection result, a computer 8 indicates the selection result on a CRT 12, thereby requesting an operator for certification.

Thereafter, the same operation as that in the third embodiment is performed to store recording paper sheets on an ejecting paper tray 14.

In the above embodiments, the image forming apparatus has been described as a printer. However, it is not limited to a printer and may also be applied to a copying machine or the like having a facsimile communication function. In the above embodiments, a single computer and a single printer are used for the descriptive convenience. However, a plurality of computers and printers connected with each other in a LAN may also be used. The computer and the image forming apparatus may also be set at different locations.

As has been described above, available recording paper sheet storage units can be detected, and the information can be transmitted to a computer or the like to designate a storage unit from the computer or the like. With this arrangement, the conventional problem can be solved, thereby realizing an image forming system having excellent operability.

The present invention can be applied to selection of a sheet feeding unit in an image forming apparatus. More specifically, the presence/absence or size of sheets in a plurality of feeding units is detected. The detection result is indicated on the CRT of a computer. An operator is prompted to select a feeding unit, or the image forming apparatus or the computer automatically selects a feeding unit. The selected feeding unit and the detection result may be indicated on the CRT of the computer.

In addition, the feeding unit automatically selected by the image forming apparatus or the computer may be changed by operating the keyboard of the computer.

What is claimed is:

1. An image forming system having an image forming apparatus for forming an image on a paper sheet in accordance with image data output from a remote computer, comprising:

a plurality of storage means, provided with the image forming apparatus, for storing the paper sheet;

a plurality of detecting means for detecting the presence or absence of the paper sheet on each of said plurality of storage means and generating a detection result;

transmitting means for transmitting the detection result of said plurality of detecting means from the image forming apparatus to the remote computer in accordance with a request from the remote computer;

determining means, provided at the remote computer, for determining said storage means to be selected on the basis of the detection result transmitted by said transmitting means and generating a determination result; and display means, provided at the remote computer, for displaying the detection result transmitted by said transmitting means.

2. A system according to claim 1, wherein each of said plurality of storage means stores the paper sheet on which an image is formed, and each of said plurality of detecting means detects a presence/absence of the paper sheet on said storage means.

3. A system according to claim 1, wherein each of said plurality of storage means stores the paper sheet on which an image is not formed, and each of said plurality of detecting means detects a presence/absence of the paper sheet on said storage means.

4. A system according to claim 1, wherein each of said plurality of storage means stores the paper sheet on which an image is not formed, and each of said plurality of detecting means detects a size of the paper sheet stored on said storage means.

5. An image forming system according to claim 1, further comprising:

input means, provided to the remote computer, for inputting an instruction for selecting said storage means;

second transmitting means for transmitting the instruction input from the remote computer to said image forming apparatus; and control means, provided to said image forming apparatus, for selecting said storage means in accordance with the instruction transmitted by said second transmitting means from the remote computer.

6. An image forming system having an image forming apparatus for forming an image on a paper sheet in accordance with image data output from a remote computer, comprising:

a plurality of storage means, provided with the image forming apparatus, for storing the paper sheet;

a plurality of detecting means for detecting the presence or absence of the paper sheet on each of said plurality of storage means and generating a detection result;

first transmitting means for transmitting the detection result of said plurality of detecting means from the image forming apparatus to the remote computer in accordance with a request from the remote computer;

determining means, provided at the remote computer, for determining said storage means to be selected on the basis of the detection result transmitted by said first transmitting means and generating a determination result;

display means, provided at the remote computer, for displaying the determination result from said determining means;

second transmitting means for transmitting the determination result from the remote computer to the image forming apparatus; and control means, provided with the image forming apparatus, for selecting said storage means in accordance with the determination result transmitted by said second transmitting means.

7. A system according to claim 6, wherein each of said plurality of storage means stores the paper sheet on which an image is not formed, and each of said plurality of detecting means detects a presence/absence of the paper sheet on said storage means.

8. A system according to claim 6, wherein each of said plurality of storage means stores the paper sheet on which an image is not formed, and each of said plurality of detecting means detects a size of the paper sheet stored on said storage means.

9. A system according to claim 6, further comprising input means, provided to said remote computer, for inputting an instruction for a change of said storage means determined by said determining means.

10. A system according to claim 6, wherein each of said plurality of storage means stores the paper sheet on which an image is formed, and each of said plurality of detecting means detects a presence/absence of the paper sheet on said storage means.

11. A control method for an image forming system having an image forming apparatus which has image forming means for forming an image on a paper sheet in accordance with image data output from a remote computer and a plurality of storage means for storing the paper sheet, comprising the steps of:

detecting the presence or absence of the paper sheet on each of the plurality of storage means and generating a detection result;

transmitting the detection result from said detecting step from the image forming apparatus to the remote computer in accordance with a request from the remote computer;

displaying the detection result at the remote computer;

inputting an instruction for selecting the storage means in the remote computer;

transmitting the input instruction from the remote computer to the image forming apparatus; and selecting the storage means in accordance with the input instruction in the image forming apparatus.

12. A method according to claim 11, wherein each of the plurality of storage means stores the paper sheet on which an image is formed, and the step of detecting comprises detecting a presence/absence of the sheet on the storage means.

13. A method according to claim 11, wherein each of the plurality of storage means stores the paper sheet on which an image is not formed, and the step of detecting comprises detecting a presence/absence of the paper sheet on the storage means.

14. A method according to claim 11, wherein each of the plurality of storage means stores the paper sheet on which an image is not formed, and the step of detecting comprises detecting a size of the paper sheet stored on the storage means.

15. A control method for an image forming system having an image forming apparatus which has image forming means for forming an image on a paper sheet in accordance with image data output from a remote computer and a plurality of storage means for storing the paper sheet, comprising the steps of:

detecting the presence or absence of the paper sheet on each of the plurality of storage means in the image forming apparatus;

transmitting the detection result from said detecting step from the image forming apparatus to the remote computer;

determining the storage means to be selected on the basis of a detection result in the remote computer;

displaying a determination result at the remote computer;

transmitting the determination result from the remote computer to the image forming apparatus; and selecting the storage means in accordance with the determination result in the image forming apparatus.

16. A method according to claim 15, wherein each of the plurality of storage means stores the paper sheet on which an image is formed, and the step of detecting comprises detecting a presence/absence of the sheet on the storage means.

17. A method according to claim 15, wherein each of the plurality of storage means stores the paper sheet on which an image is not formed, and the step of detecting comprises detecting a presence/absence of the paper sheet on the storage means.

18. A method according to claim 15, wherein each of the plurality of storage means stores the paper sheet on which an image is not formed, and the step of detecting comprises detecting a size of the paper sheet stored on the storage means.

19. A method according to claim 15, further comprising the step of inputting of an instruction for a change of the storage means determined by determining means in the remote computer.

20. A control method for an image forming system having an image forming apparatus which has image forming means for forming an image on a paper sheet in accordance with image data output from an image processing apparatus and a plurality of storage means for storing the paper sheets, comprising the steps of:

detecting the paper sheet on each of the plurality of storage means in the image forming apparatus;

determining the storage means to be selected on the basis of a detection result in the image forming apparatus;

displaying a determination result in the image processing apparatus; and selecting the storage means in accordance with the determination result in the image forming apparatus.

21. A method according to claim 20, wherein the storage means stores the paper sheet on which an image is formed, and the step of detecting comprises detecting a presence/absence of the sheet on the storage means.

22. A method according to claim 20, wherein the storage means stores the paper sheet on which an image is not formed, and the step of detecting comprises detecting a presence/absence of the paper sheet on the storage means.

23. A method according to page 20, wherein the storage means stores the paper sheet on which an image is not formed, and the step of detecting comprises detecting a size of the paper sheet stored on the storage means.

24. A method according to page 20, further comprising the step of inputting of an instruction for a change of the storage means determined by determining means in the image processing apparatus.

25. An image forming apparatus for forming an image on a paper sheet in accordance with image data output from a remote computer, comprising:

a plurality of storage means, provided with the image forming apparatus, for storing the paper sheet with the image formed thereon;

a plurality of detecting means for detecting the presence or absence of the paper sheet on each of said plurality of storage means and generating a detection result;

first transmitting means for transmitting the detection result from the plurality of detecting means to the remote computer in accordance with a request from the remote computer;

display means for displaying the detection result at the remote computer;

inputting means for inputting an instruction for selecting the storage means at the remote computer;

second transmitting means for transmitting the input instruction to the image forming apparatus; and selecting means for selecting the storage means in accordance with the input instruction in the image forming apparatus.

26. An image forming apparatus according to claim 25, wherein said plurality of storage means are bins of a sorter.

27. An image forming apparatus for forming an image on a paper sheet in accordance with image data output from any one of a plurality of remote computers, comprising:

a plurality of storage means for storing the paper sheet;

a plurality of detecting means for detecting the paper sheet on said plurality of storage means and generating a detection result;

transmitting means for transmitting the detection result of said detecting means to any one of the remote computers; and determining means, provided at each of the remote computers, for determining said storage means to be selected on the basis of the detection result transmitted by said transmitting means and generating a determination result.

28. An image forming apparatus according to claim 27, wherein said storage means stores the sheet after image formation.

29. An image forming method for forming an image on a paper sheet in accordance with image data output from any one of a plurality of remote computers, comprising:

providing a plurality of storage means for storing paper sheets on which images have been formed;

detecting a presence of a paper sheet on each of the plurality of storage means and generating a detection result;

transmitting the detection result to any one of said remote computers;

determining said storage means to be selected on the basis of the detection result transmitted by the transmitting means and generating a determination result; and displaying the transmitted detection result at the remote computer.

30. An image forming method for forming an image with an image forming apparatus on a paper sheet in accordance with image data output from a remote computer, comprising:

providing a plurality of storage means on the image forming apparatus for storing the paper sheet with the image formed thereon;

detecting a presence or absence of the paper sheet on each of the plurality of storage means and generating a detection result;

transmitting the detection result to the remote computer in accordance with a request from the remote computer;

determining a storage means to be selected on the basis of the transmitted detection result and generating a determination result;

displaying the determination result at the remote computer;

transmitting the determination result from the remote computer to the image forming apparatus; and selecting a storage means in accordance with the determination result transmitted from the remote computer.

31. A control method for an image forming system having an image forming apparatus which has image forming means for forming an image on a paper sheet in accordance with image data output from a remote computer and a plurality of storage means for storing the paper sheets, the image forming apparatus generating status information, capable of being displayed on the remote computer, including information representing the presence or absence of the paper sheet on each of the plurality of storage means, said method comprising the steps of:

transmitting a command requiring the status information from the remote computer to the image forming apparatus;

receiving the status information output from the image forming apparatus in accordance with the command from the remote computer;

displaying the status information received in said receiving step, at the remote computer;

inputting, subsequent to the display of the status information at the remote computer, an instruction for selecting the storage means in the remote computer; and transmitting a command for selecting the storage means from the remote computer to the image forming apparatus in accordance with the input instruction.

32. A method according to claim 31, wherein each of the plurality of storage means stores the paper sheet on which an image is formed, and the status information includes the information concerning the presence/absence of the paper sheet on the storage means.

33. A method according to claim 31, wherein each of the plurality of storage means stores the paper sheet on which an image is not formed, and the status information includes the sheet information concerning the presence/absence of the paper sheet storage on the storage means.

34. A method according to claim 31, wherein each of the plurality of storage means stores the paper sheet on which an image is not formed, and the status information includes information concerning a size of the paper sheet stored on the storage means.

35. A control method for an image forming system having an image forming apparatus which has image forming means for forming an image on a paper sheet in accordance with image data output from a remote computer and a plurality of storage means for storing the paper sheets, the image forming apparatus generating status information, capable of being output to the remote computer, including information representing the presence or absence of the paper sheet on each of the plurality of storage means, said method, comprising the steps of:

transmitting a command requiring the status information from the remote computer to the image forming apparatus;

receiving the status information output from the image forming apparatus in accordance with the command from the remote computer;

determining the storage means to be selected on the basis of the status information received in said receiving step, in the remote computer;

displaying a determination result at the remote computer; and transmitting a command for selecting the storage means from the remote computer to the image forming apparatus in accordance with the determination result.

36. A method according to claim 35, wherein each of the plurality of storage means stores the paper sheet on which an image is formed, and the status information includes the information concerning the presence/absence of the paper sheet on the storage means.

37. A method according to claim 35, wherein each of the plurality of storage means stores the paper sheet on which an image is not formed, and the status information includes the information concerning the presence/absence of the paper sheet on the storage means.

38. A method according to claim 35, wherein each of the plurality of storage means stores the paper sheet on which an image is not formed, and the status information includes information concerning a size of the paper sheet stored in the storage means.

39. A method according to claim 35, further comprising the step of inputting of an instruction for a change of the storage means determined in the remote computer.

40. A control method for an image formation apparatus which has image forming means for forming an image on a paper sheet in accordance with image data output from any of plural remote computers and plural storage means for storing the paper sheets, comprising the steps of:

a first step of generating status information which includes information representing presence or absence of the paper sheet on each of said plural storage means and can be displayed by the remote computer;

a second step of receiving a first command which is output from any of the plural computers and to request the status information;

a third step of transmitting the status information to the remote computer which is in the plural remote computers and outputs the first command, in accordance with the reception of the first command in said second step;

a fourth step of receiving a second command which includes an instruction to select the storage means, from the remote computer which received the status information transmitted in said third step; and a fifth step of selecting the storage means in accordance with the reception of the second command in said fourth step.

41. A method according to claim 40, wherein each of the plurality of storage means stores the paper sheet on which an image is formed, and the status information includes the information concerning the presence/absence of the paper sheet on the storage means.

42. A method according to claim 40, wherein each of the plurality of storage means stores the paper sheet on which an image is not formed, and the status information includes the information concerning the presence/absence of the paper sheet on the storage means.

43. A method according to claim 40, wherein each of the plurality of storage means stores the paper sheet on which an image is not formed, and the status information includes information concerning a size of the paper sheet stored on the storage means.

* * * * *

UNITED STATES PATENT AND TRADEMARK OFFICE
CERTIFICATE OF CORRECTION

PATENT NO. : 6,125,305

DATED : September 26, 2000

INVENTOR(S): SHIGERU SUGITA, ET AL.

It is certified that error appears in the above-identified patent and that said Letters Patent is hereby corrected as shown below:

COLUMN 1:
Line 23, "destinated" should read --destined--.

COLUMN 7:
Line 60, "page 20," should read --claim 20,--; and
Line 64, "page 20," should read --claim 20,--.

Signed and Sealed this

First Day of May, 2001

Attest:

NICHOLAS P. GODICI

Attesting Officer     Acting Director of the United States Patent and Trademark Office